(12) United States Patent
Strumpen

(10) Patent No.: US 8,364,895 B2
(45) Date of Patent: Jan. 29, 2013

(54) GLOBAL INSTRUCTIONS FOR SPIRAL CACHE MANAGEMENT

(75) Inventor: Volker Strumpen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/419,143

(22) Filed: Mar. 13, 2012

(65) Prior Publication Data

US 2012/0179872 A1     Jul. 12, 2012

Related U.S. Application Data

(63) Continuation of application No. 12/640,400, filed on Dec. 17, 2009.

(51) Int. Cl.
*G06F 12/00* (2006.01)

(52) U.S. Cl. ......... 711/122; 711/135

(58) Field of Classification Search ............ 711/122, 711/135
See application file for complete search history.

(56) References Cited

U.S. PATENT DOCUMENTS

| | | | |
|---|---|---|---|
| 5,355,345 A | 10/1994 | Dickinson et al. | |
| 5,564,041 A | 10/1996 | Shigezumi et al. | |
| 6,665,767 B1 | 12/2003 | Comisky et al. | |
| 6,996,117 B2 | 2/2006 | Lee et al. | |
| 7,107,399 B2 | 9/2006 | Bilardi et al. | |
| 7,461,210 B1* | 12/2008 | Wentzlaff et al. | 711/135 |
| 7,805,575 B1* | 9/2010 | Agarwal et al. | 711/141 |
| 2002/0083266 A1* | 6/2002 | Reuter | 711/118 |
| 2002/0116579 A1 | 8/2002 | Goodhue et al. | |
| 2003/0145239 A1 | 7/2003 | Kever et al. | |
| 2003/0236961 A1 | 12/2003 | Qiu et al. | |
| 2004/0148482 A1 | 7/2004 | Grundy et al. | |
| 2005/0114618 A1 | 5/2005 | Lu et al. | |
| 2005/0125702 A1 | 6/2005 | Huang et al. | |
| 2005/0132140 A1 | 6/2005 | Burger et al. | |
| 2006/0143384 A1 | 6/2006 | Hughes et al. | |
| 2006/0212654 A1 | 9/2006 | Balakrishnan | |
| 2007/0022309 A1 | 1/2007 | Adamo et al. | |
| 2010/0064108 A1* | 3/2010 | Harris et al. | 711/146 |

OTHER PUBLICATIONS

U.S. Appl. No. 12/270,095, filed Nov. 13, 2008, Strumpen, et al.
U.S. Appl. No. 12/270,132, filed Nov. 13, 2008, Strumpen, et al.
U.S. Appl. No. 12/270,186, filed Nov. 13, 2008, Strumpen, et al.
U.S. Appl. No. 12/270,249, filed Nov. 13, 2008, Strumpen, et al.
U.S. Appl. No. 12/264,682, filed Nov. 4, 2008, Li et al.
Strumpen, et al., "The Spiral Cache: A Self-Organizing Memory Architecture", IBM Research Report, No. RC24767, Mar. 2009, San Jose, CA.
Bilardi et al., "Optimal Organizations for Pipelined Hierarchical Memories", SPAA '02, Aug. 2002, p. 109-116, Winnipeg, Manitoba, Canada.

(Continued)

*Primary Examiner* — Hashem Farrokh
(74) *Attorney, Agent, or Firm* — Mitch Harris, Atty at Law, LLC; Andrew M. Harris; Eustas D. Nelson

(57) ABSTRACT

A method of operation of a pipelined cache memory supports global operations within the cache. The cache may be a spiral cache, with a move-to-front M2F network for moving values from a backing store to a front-most tile coupled to a processor or lower-order level of a memory hierarchy and a spiral push-back network for pushing out modified values to the backing-store. The cache controller manages application of global commands by propagating individual commands to the tiles. The global commands may provide zeroing, flushing and reconciling of the given tiles. Commands for interrupting and resuming interrupted global commands may be implemented, to reduce halting or slowing of processing while other global operations are in process. A line detector within each tile supports reconcile and flush operations, and a line patcher in the controller provides for initializing address ranges with no processor intervention.

10 Claims, 7 Drawing Sheets

OTHER PUBLICATIONS

Kwon et al., "A Scalable Memory System Design", 10$^{th}$ International Conference on VLSI Design, Jan. 1997, p. 257-260.

Kim et al., "An Adaptive, Non-Uniform Cache Structure for Wire-Delay Dominated On-Chip Caches", ASPLOS X, Oct. 2002, p. 211-222, San Jose, CA.

Baer et al., "On the Inclusion Properties for Multi-Level Cache Hierarchies", IEEE, Feb. 1988, p. 73-80.

Dickinson et al., "A Systolic Architecture for High Speed Pipelined Memories", IEEE, 1993, p. 406-409.

Beckmann et al., "Managing Wire Delay in Large Chip-Multiprocessor Caches", 37th Annual IEEE/ACM International Symposium on Microarchitecture, Dec. 2004, p. 319-330, Portland, OR.

Chishti et al., "Distance Associativity for High-Performance Energy-Efficient Non-Uniform Cache Architectures", 36th Annual IEEE/ACM International Symposium on Microarchitecture, Dec. 2003, 55-66, San Diego, CA.

Dybdahl et al., "An Adaptive Shared/Private NUCA Cache Partitioning Scheme for Chip Multiprocessors", 13th International Symposium on High Performance Computer Architecture, Feb. 2007, p. 2-12, Phoenix, AZ.

Foglia et al, "A NUCA Model for Embedded Systems Cache Design", 3rd IEEE Workshop on Embedded Systems for Real-Time Multimedia, Sep. 2005, p. 41-46, New York, NY.

Huh et al., "A NUCA Substrate for Flexible CMP Cache Sharing", International Conference on Supercomputing, Jun. 2005, p. 31-40, Boston, MA.

Abella et al., "Power Efficient Data Cache Designs", IEEE Computer Society, Oct. 2003, p. 3-8, San Jose, CA.

Gilbert et al., "Variable-Based Multi-Modual Data Caches for Clustered VLIW Processors", IEEE Computer Society, Sep. 2005, p. 3-13, St. Louis, MO.

Gonzales et al., "A Data Cache with Multiple Caching Strategies Tuned to Different Types of Locality", ACM, 1995, p. 338-347.

Lee et al., "Region-Based Caching: An Energy Delay Efficient Memory Architecture for Embedded Processors", CASES, 2000, p. 120-127.

Muralimanohar et al., "Optimizing NUCA Organizations and Wiring Alternatives for Large Caches With CACTI 6.0", 40th Annual IEEE/ACM International Symposium on Microarchitecture, Dec. 2007, p. 3-14, Chicago, IL.

Matteo Frigo. The Weakest Reasonable Memory Model. Master's thesis, Department of Electrical Engineering and Computer Science, Massachsetts Institute of Technology, 1998.

Blumofe, et al., "Dag-Consistent Distributed Shared Memory", Proceedings of the 10th International Parallel Processing Symposium (IPPS), pp. 132-141, Honolulu, Hawaii, 1996.

Molnar, et al., "Counterflow Pipeline Processor Architecture", Technical report, SMLI TR-94-25, Sun Microsystems Laboratories, Inc., 1994.

Akioka, et al., "Ring data location prediction scheme for Non-Uniform Cache Architectures," *International Conference on Computer Design*, Piscataway 2008.

Jin, et al., "A Domain-Specific On-Chip Network Design for Large Scale Cache Systems," *13th International Symposium on High-Performance Computer Architecture (HPCA-13)*, Phoenix, 2007.

Definition of "systole"; Retrieved from http://www.merriam-webster.com/dictionary/systolic on May 10, 2012.

Office Action in U.S. Appl. No. 12/270,132 mailed on May 23, 2012.
Office Action in U.S. Appl. No. 13/419,143 mailed on Jun. 21, 2012.
Office Action in U.S. Appl. No. 12/640,451 mailed on Jul. 24, 2012.
Office Action in U.S. Appl. No. 12/640,400 mailed on Jun. 13, 2012.

\* cited by examiner

US 8,364,895 B2

GLOBAL INSTRUCTIONS FOR SPIRAL CACHE MANAGEMENT

The present application is a Continuation of U.S. patent application Ser. No. 12/640,400, filed on Dec. 17, 2009 and claims priority thereto under 35 U.S.C. §120. The disclosure of the above-referenced parent U.S. patent application is incorporated herein by reference.

BACKGROUND OF THE INVENTION

1. Field of the Invention

The present invention is related to cache memories, and more particularly to global command processing for a tiled cache memory wherein the tiles contain caches.

2. Description of Related Art

Traditional cache memory controllers feature several high-level "global" command operations that provide improved system operation and provide correctness in some multi-processor and/or multi-threading environments. Commands such as zeroing (or other initializer) operations provide a fast way to initialize data areas for programs, rather than initializing a region in memory and then having to wait for the initialized values to be loaded as the cache misses on an access to the region. Other commands such as flush and reconcile provide the ability to quickly unload a cache or a portion of a cache to ensure memory consistency.

The above operations are necessary, and where they can be implemented in a single global cache instruction, rather than having a processor perform all of the action, such global cache instructions are very useful. However, in architectures such as tiled caches, the penalty to process such an instruction in the pipeline might take as long as using individual accesses to accomplish the same task. Further, when performing a global cache operation, processing can be stalled while the operation completes.

Therefore, it is desirable to provide global commands and global command processing in a pipelined cache in such a way to efficiently perform the command operations. It would also be desirable to provide a mechanism by which slowing or halting of processing can be avoided while performing global cache operations in a pipelined cache.

BRIEF SUMMARY OF THE INVENTION

The invention is embodied in a method of operation of a pipelined cache that process global cache commands. The pipelined cache includes multiple storage tiles, which are generally smaller caches that receive values from an input interface and are pushed back along a network interconnecting the tiles. The cache may be a spiral cache, with a move-to-front M2F network for moving values from a backing store to a front-most tile coupled to a processor or lower-order level of a memory hierarchy and a spiral push-back network for pushing out modified values to the backing-store. The method is a method of performing operations in response to global commands issued to the pipelined cache.

The cache receives a global command implicating one or more cache lines within the plurality of tiles. In accordance with one embodiment of the invention, the command is a initializing command for initializing an address range in the cache. The initializing command is handled by the cache's controller, e.g., the memory interface of a spiral cache. The memory interface receives the command, and includes a line patcher so that when a partial cache line is implicated by the address range of the command, the particular cache lines are retrieved, modified and returned to the cache without requiring a system processor to perform such operations.

In accordance with another embodiment of the invention, the command is a reconcile or flush operation. At least a portion of the reconcile or flush operation is performed in parallel in the tiles. A line detector within each tile locates and produces a dirty line tag/address, if a dirty line is present in memory. The dirty line is then pushed-back when a flush or reconcile command is received by the tile. The parallel portion of the operation may include just the line detection, so that writes to the backing store may be properly paced. However, if other mechanisms are employed to avoid overflowing the backing store, the reconcile or flush command can be sent directly to multiple tiles and both the line detection and push-back operations can be performed in parallel.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses methods for performing global cache operations in a pipelined cache formed from multiple storage tiles. The tiles may be structurally organized as a spiral that has a move-to-front M2F network for moving values forward to front-most tile for access by a processor or lower-order level of a memory hierarchy, and a push-back network for moving values backward away from the front-most tile toward a backing store. The global operation commands are propagated among the storage tiles or handled in the controller (memory interface of the spiral cache). Given tiles implicated by the command (which may be every tile) act on the commands to complete them, and at least a portion of the operations may be performed in parallel at the tiles. A controller, which may be a memory interface of a spiral cache, also participates in completion of the global commands. In particular a command to initialize/zero a range of addresses is supported by the memory interface so that processor participation is not required in resolving an alignment of the address range with cache line addresses and in patching partial lines that are initialized by the operation.

In particular, global operations supported in tiled storage devices according to embodiments of the present invention include, but are not limited to:

cbzero (cache block zero)—sets all bytes within a specified address range to zero or another initialization value.
crecon (cache reconcile)—copies all dirty lines to the backing store, effectively rendering all dirty lines clean.
cflush (cache reconcile-and-flush)—moves all dirty lines to the backing store, effectively reconciling and invalidating all cache lines.
cintr (cache interrupt)—interrupts a cache instruction.
ciret (cache-return-from-interrupt)—restarts a previously-interrupted cache instruction.

Details for implementing the above-listed commands as global cache operations will be described in detail below, after description of a particular exemplary spiral cache architecture in accordance with an embodiment of the invention, in which the global operations are practiced.

Figure 1:
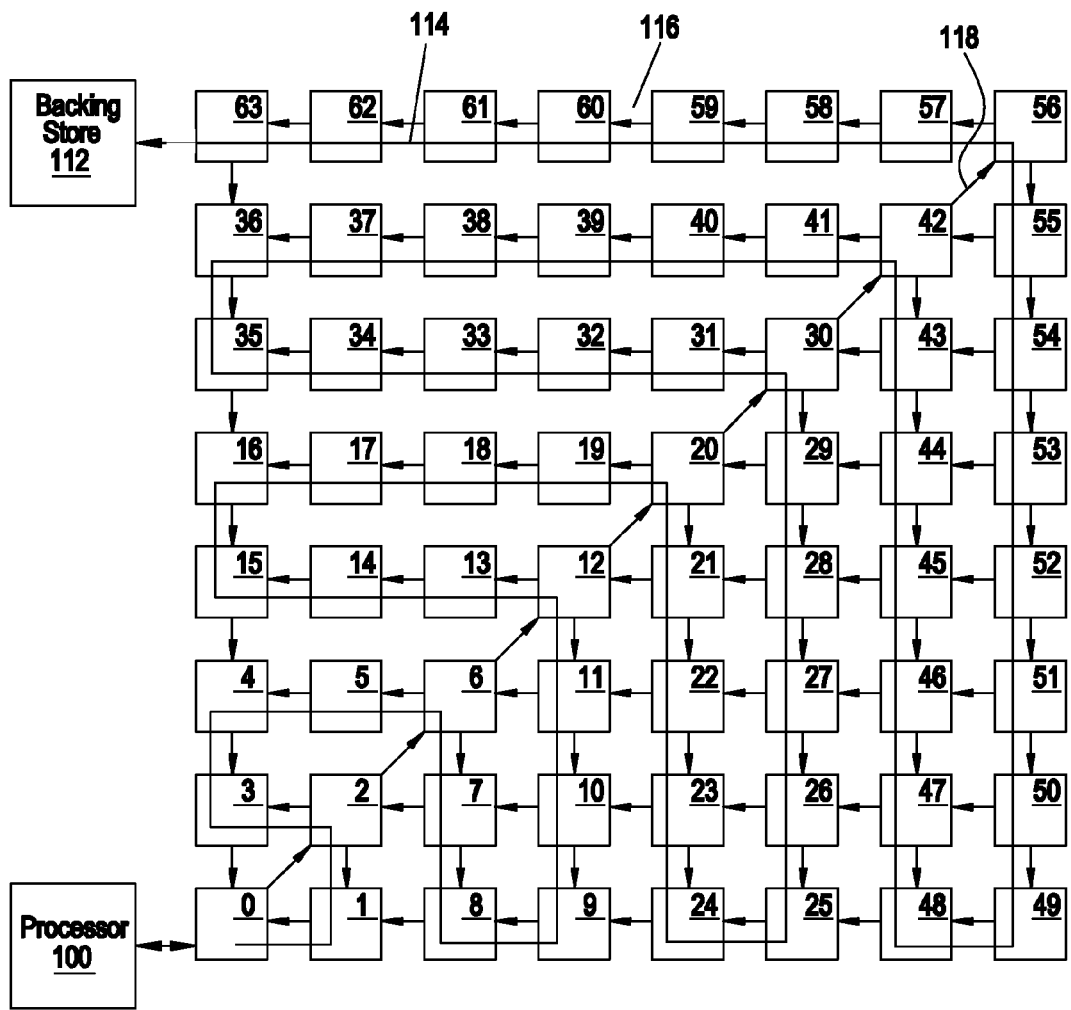
FIG. 1 is a block diagram of a system incorporating a spiral cache according to an embodiment of the present invention.

Spiral Cache Architecture Referring now to FIG. 1, a spiral cache in accordance with an embodiment of the invention is shown. The illustrated spiral cache is composed of tiles 0-63 that each contain storage elements, such as a small direct-mapped cache memory. The illustrated spiral cache includes two systolic networks, a push-back (spiral) network 114 and a move-to-front network 116. Push-back network 114 imposes a linear structure on the tiles and is coupled at front-most tile 0 to a processor 100 and at a back-most tile 63 to a backing store 112. Each of tiles 0-63 contains a fast cache memory, such as a direct-mapped cache, and the unit of data transfer across the networks in such a configuration is a cache line. The move-to-front heuristic places cache lines into tiles. A processor issues load or store operations to front-most tile 0. Independent of the particular operation being performed on a value, the spiral cache fetches the corresponding cache line and places it in front-most tile 0. For processor load operations, the desired data are also sent to processor 100. For processor store operations, the cache line is patched with the store data before writing the cache line into the cache of tile 0. If the corresponding cache line storage of tile 0 is occupied, the line currently stored in the corresponding location is pushed back to empty the cache line storage to accept the new line. The push-back operation effectively swaps values (e.g., cache lines) back at each tile along push-back network 114. Data being pushed back travel along push-back network 114 from front-most tile 0 towards the tail end of the spiral, until an empty line is located, or until the data is pushed out of the spiral cache into backing store 112. The present invention concerns global operations that are performed in response to commands received by the spiral cache, generally from processor 100, specifically operations that initialize cache lines, and commands that flush or reconcile the entire cache with backing store 112.

The cache line being accessed by a load or store operation may be located within the spiral cache, or the cache line may be absent. If the cache line is present, the spiral cache can report a hit, which completes the associated operation successfully. Otherwise, if the accessed cache line is not present in the spiral cache, we incur a miss. A miss requires fetching the cache line from backing store 112 and moving the cache line to front-most tile 0. The move-to-front (M2F) operation involves not only the move-to-front network 114 inside the spiral cache, but requires an additional connection to backing store 112. The spiral cache pipelines the accesses to the tile caches and the communication via the networks in a systolic fashion. A 1-quadrant spiral cache with N tiles forms a pipeline with $3\sqrt{N}-1$ stages. As shown in FIG. 1, the pipeline stretches from tile 0 across the diagonal to tile 56, down along the boundary at the right-hand side of the Figure to tile 49, and along the boundary at the bottom of the Figure back to tile 0, for a total of $3\sqrt{N}-1$ stages. For simplicity, the approximate number of pipeline stages $3\sqrt{N}$ will be used in expressions below.

Figure 2:
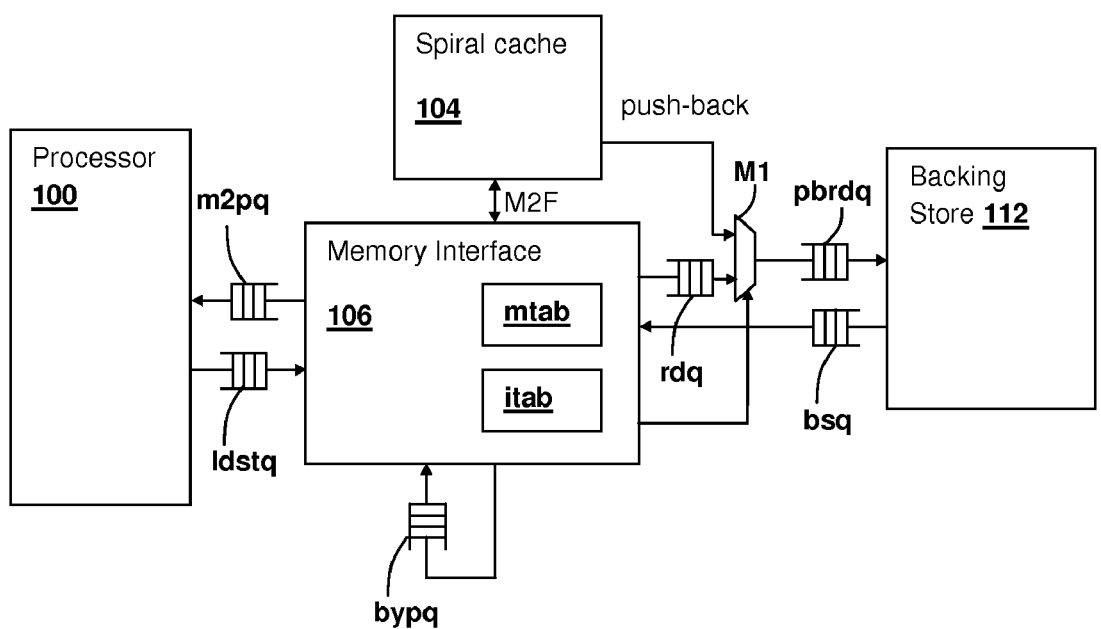
FIG. 2 is a block diagram illustrating further details of a spiral cache integrated within a memory hierarchy in accordance with an embodiment of the present invention.

System Integration of a Spiral Cache Referring now to FIG. 2, a block diagram of a hierarchical system including a spiral cache 104 is shown in accordance with an embodiment of the present invention. The system includes a number of queues that interconnect processor 100 and backing store 112 with spiral cache 104. The system of FIG. 2 also includes a memory interface 106 that manages the above-described M2F and push-back operations occurring at front-most tile 0 and back-most tile 63 in spiral cache 104, in order to meet the ordering requirements for processor 100 and preserve the single-copy invariant condition within spiral cache 104. Further, memory interface 106 manages application of the global operations of the present invention, so that the much slower backing store 112 is not overwhelmed with push-back write requests generated by performing the global operations. With the exception of the push-back output of the spiral cache, memory interface 106 controls all dataflow between processor 100, backing store 112, spiral cache 104 and the various queues. The processor is de-coupled from the memory system by means of two queues, a load-store queue ldstq and a memory-to-processor queue m2pq. The same de-coupling interface can be employed if spiral cache 104 implements a higher-order level of the memory hierarchy, in which case the next lower-ordered cache would be connected in place of processor 100. However, when integrating spiral cache 104 with contemporary processors, the processors already include some of the functionality of memory interface 106 to track ordering of memory operations. Therefore, portions of memory interface 106 and load-store queue ldstq, memory-to-processor queue m2pq, and bypass queue bypq could be integrated into processor 100. In the following description, it is assumed that other than in load-store queue ldstq and memory-to-processor queue m2pq, the unit of data transfer within spiral cache 104, as well as across all queues is a cache line.

Queues and Tables The various queues and tables included in the system of FIG. 2 are summarized below and are implemented in hardware. The processor issues load and store requests to memory by enqueuing them into load-store queue ldstq. The memory system returns load values and potentially store acknowledgements to the processor via the memory-to-processor queue m2pq. When the spiral cache misses, memory interface 106 sends a read request to backing store 112 by enqueuing it into a read queue rdq. Two types of requests may be sent from spiral cache 104 to backing store 112, read requests as mentioned above and write requests originating from the tail end of the push-back network. A push-back/read queue pbrdq serializes these two types of requests and presents them to backing store 112. As will be explained in further detail below, read requests enqueued in read queue rdq are immediately passed through to push-back/read queue pbrdq, unless a backing store write request (due to a push-back leaving the tail end of spiral cache 104) is being enqueued at the same time, causing a conflict. If a conflict exists, multiplexer M1 "favors" enqueing a backing-store write request into push-back/read queue pbrdq and read requests are pended in read queue rdq. Backing store 112 responds with cache lines retrieved in response to read requests by enqueuing them into a backing store queue bsq. A bypass queue bypq enables memory interface 106 to accept multiple outstanding read requests to the same cache line in backing store 112, without incurring the presumably high backing store access latency for each request.

In addition to the queues described above, memory interface 106 contains two tables: An issue table itab keeps track of all outstanding memory operations, and ensures that memory interface 106 performs load and store operations to the same cache line in the order issued by the processor into load-store queue ldstq. A backing store request table mtab keeps track of all outstanding backing-store read operations, and guarantees that multiple read requests directed to the same cache line result in a single read operation from backing store 112, which preserves the single-copy invariant condition. A primary function of the queueing system architecture depicted in FIG. 2 is to coordinate the dataflow between components having different access latencies and throughput, e.g., backing store 112 vs. spiral cache 104. Spiral cache 104 has variable access latency and throughput. Backing store 112 generally has much larger latency, typically about three orders of magnitude larger than the best-case access latency of spiral cache 104. Also, backing store 112 may or may not permit pipelined operation. Processor 100 may produce memory operations at a rate as high as one operation per clock cycle. The following description limits processor operations to load and store operations, and assumes that processor 100 can stall if load-store queue ldstq is full.

The dataflow of a memory operation through the memory system depicted in FIG. 2 is described below. Processor 100 enqueues a load or store request in load-store queue ldstq. Memory interface 106 dequeues the request, inserts the request into issue table itab, and issues the address into the move-to-front network of spiral cache 104. Depending on the placement of the requested cache line, it may require multiple retries before the request succeeds with a hit or the request results in a miss. If the spiral cache responds with a hit, the next action depends on the type of the operation. If the request is associated with a load operation, the value is returned to the processor by enqueuing it in the memory-to-processor queue m2pq. Otherwise, if the request is associated with a store operation, the store value is retrieved from issue table itab and patched into the cache line, before storing the value in front-most tile 0. If processor 100 requires a store acknowledgement, the store acknowledgement is enqueued into memory-to-processor queue m2pq and the value is stored in front-most tile 0. For either type of operation, the corresponding entry in issue table itab is then removed, and the request is completed. If the spiral cache 104 responds with a miss, memory interface 106 issues a read request to backing store 112. Memory interface 104 enqueues the read request into read queue rdq and inserts the address into backing store request table mtab. Backing store 112 responds with the requested cache line by enqueuing it into backing store queue bsq. Memory interface 106 dequeues the cache line from backing store queue bsq, and stores it in front-most tile 0, potentially patched with a store value that was stored in issue table itab if the operation requesting the cache line was a store operation. The entry in backing store request table mtab entry is deleted, and bypass queue bypq entries are updated, as will be described in further detail below. As when the operation hits in spiral cache 104, a reply to processor 100 is enqueued in memory-to-processor queue m2pq and the corresponding entry in issue table itab is removed, which completes the request. The above description applies to a single memory operation. System operation becomes more complex when multiple operations are in flight. Due to concurrency, three issues must be tackled to guarantee correct operation, ordering of responses, and proper flow-control: (1) ordering of responses to the same cache line that hit in spiral cache 104; (2) serialization of push-back write requests from spiral cache 104 and read requests from the memory interface 106 before the requests are sent to backing store 112; and (3) handling multiple requests to the same cache line for requests that miss in spiral cache 104.

As described above, memory interface 106 serves as the controller that controls interactions between processor 100, spiral cache 104, and backing store 112. Memory interface 106 also coordinates the global operations of the present invention, which are generally performed in response to specific commands received by spiral cache 104 from processor 100. The hierarchical memory system illustrated in FIG. 2 uses flow control to prevent queue overflows. In general, the critical queue is push-back/read queue pbrdq, which connects the relatively fast spiral cache 104 with relatively slow backing store 112. In particular, spiral cache 104 may generate up to one backing store access per systolic duty cycle, while backing store 112 may require tens or even hundreds of cycles to service each access. Overflow of push-back/read queue pbrdq is prevented by memory interface 106 monitoring the number of free entries in push-back/read queue pbrdq, and throttling issue of new load or store operations into spiral cache 104 until sufficient entries are available in push-back/read queue pbrdq: in general such that at most $3\sqrt{N}$ outstanding M2F requests can be introduced into spiral cache 104 only if there are $3\sqrt{N}$ empty locations in push-back/read queue pbrdq.

Figure 3:
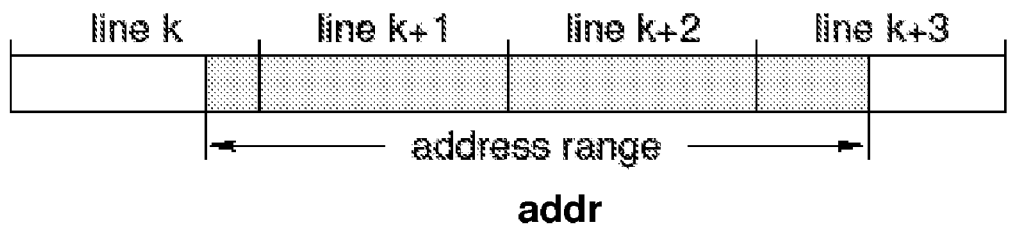
FIG. 3 is a diagram illustrating a range of values stored across multiple cache lines in the spiral cache of FIG. 1.

Cache Block Initialization Operation Cache block initialization operations are supported by the storage device and methods of the present invention. While "zeroing" is referred to in the descriptive embodiment, it is understood that initialization to other byte or multi-byte values is contemplated by the operation as described below in accordance with an embodiment of the present invention. Initializing a block of memory is a common operation in computer systems. For example, such commands are used to initialize and to erase the contents of a program's workspace. In a memory hierarchy with a cache memory the task of zeroing a block of memory can be sped up significantly, if accesses to the backing store can be avoided. If the address range is in the cache, the initialization can be performed by initializing lines in the cache. If the address range includes entire cache lines that are not in the cache, then those lines do not need to be fetched from backing store 112. Instead, it is only necessary to generate a newly initialized line in the cache, marking the line as dirty, so that the line will be eventually reconciled with the backing store. Only if the address range to be initialized includes partial cache lines, and the cache lookup misses in spiral cache 104, does the partially-implicated cache line need to be fetched from backing store 112, since the existing cache line must be patched to keep the uninitialized portion of the cache line consistent. For address ranges much larger than the cache line size, partial initialization applies at most to the two cache lines at the lower and upper bound of the range, as illustrated in FIG. 3. FIG. 3 illustrates an address range addr to be initialized by the cbzero command. Cache lines k+1 and k+2 are covered entirely by the address range, while lines k and k+3 lie only partially within the range and therefore must be patched.

The cbzero command illustrated herein is compatible with the PowerPC instruction dcbz, "data-cache-block-set-to-zero" command. The POWER architecture (as promulgated by power.org), is not a requirement nor limitation of the present invention, but is a convenient framework for illustrating a specific instruction format and expected operational result. The present invention provides a cbzero instruction with enhanced portability in that the implementation is independent of the line size of the underlying cache, and permits zeroing of arbitrary sized blocks. The format of the cbzero instruction in the illustrative example is:

cbzero<addr><nbytes> where addr is a start address and nbytes is the number of bytes to be zeroed. The consequent operation stores a zero value in each byte of a consecutive memory block of length nbytes and starting at addr, as illustrated by the memory region shown in FIG. 3. In general, under many conditions, the operation associated with the cbzero command can be completed, at least in part, without accessing backing store 112. For each cache line included entirely within address range [addr, ... , addr+nbytes−1], if included cache line is present in spiral cache 104, then the stored cache line can be zeroed and marked as dirty. Thus, the behavior of the cbzero command in such instances resembles that of a regular store operation, except that the entire cache line is modified. Otherwise, if a completely included cache line is not present in the cache, then a fetch of the cache line from backing store 112 can also be avoided. It is only necessary to generate a new initialized (zeroed) line into the cache, with the cache line marked as dirty. Similar to a regular store operation, the write may evict a conflicting line into backing store 112. Unlike a regular store operation, however, the line does not have to be fetched from the backing store in order to "patch" the write value into the cache line. Patching is only required if address range addr partially covers a cache line, which will only occur within the first and/or last cache line(s) of the address range.

cbzero Implementation The cbzero instruction as illustrated herein is implemented as a sequence of store operations to the cache lines covered by the address range. The illustrated algorithm is implemented entirely within memory interface 106, although operations associated with ordinary requests and responses to and from spiral cache 104 are used to initialize the specified address range addr. Therefore, no modification to the tiles or network design of spiral cache 104 is necessary to support the cbzero operation of the illustrated embodiment. However, memory interface 106, in the illustrated embodiment, includes two additional structures to support the cbzero operation:

1. A line patcher capable of setting a contiguous subset of bytes within a cache line to zero or another initialization value,
2. A control unit for generating addresses for M2F requests for each cache line in the requested address range, and handling cache misses properly.

Figure 4:
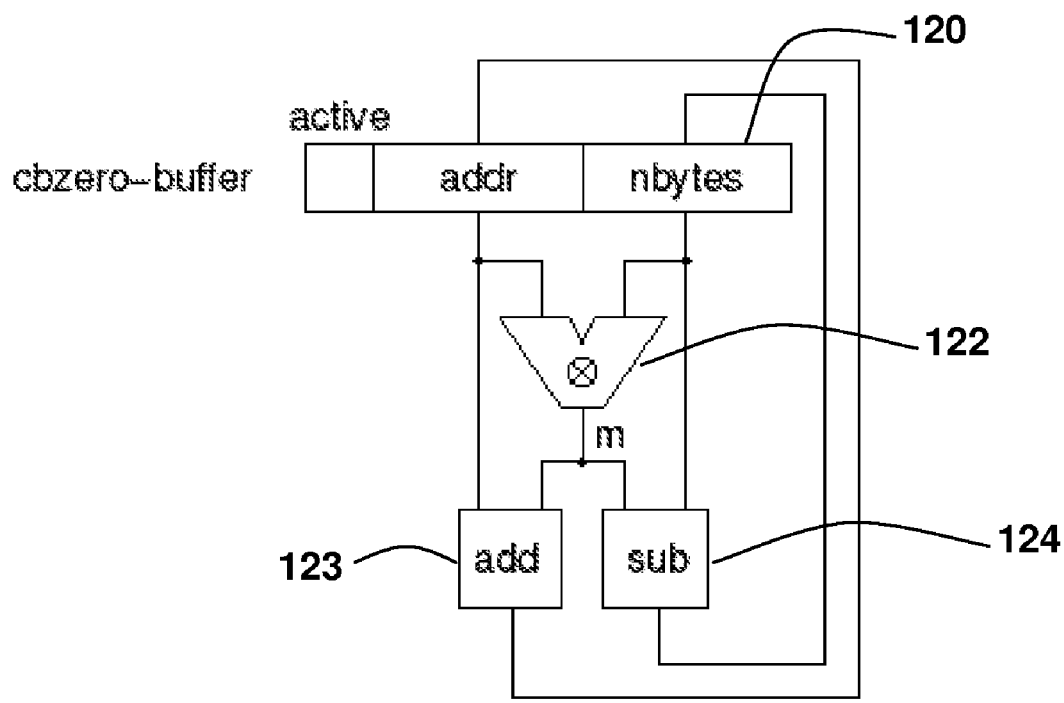
FIG. 4 is a simplified schematic diagram of a control unit for performing a cache zeroing instruction in accordance with an embodiment of the present invention.

The line patcher is activated just before a cache line is stored in front-most tile 0 of spiral cache 104. The line patcher patches a cache line by writing zero (or other initializing values) into locations within the cache line according to the address range specified by addr and nbytes. Referring now to FIG. 4 a control unit for performing the cbzero operation is shown. The illustrated control unit includes a register 120 having three fields: an "active" bit, address addr and a number of bytes nbytes. Register 120 is therefore initialized with the arguments of instruction cbzero. A ⊗ operator 122 computes the number of bytes m for a next chunk of the address range. A chunk can be at most the size of a cache line, but can be less than a cache line if nbytes is smaller than a cache line or the chunk is located at the beginning or the end of an address range that covers multiple cache lines. Accordingly, value m is computed as $$m=\min(\mathrm{addr}_{[L]}-\mathrm{addr},\mathrm{nbytes}),$$

where $\mathrm{addr}_{[L]}$ denotes the smallest multiple of the cache line size L greater than addr. Execution of a cbzero instruction involves the queuing infrastructure illustrated in FIG. 2, as well. When memory interface 106 dequeues a cbzero instruction from the load store queue ldstq memory interface 106 initializes register 120 of the control unit of FIG. 4. The active bit is set, and address addr and number of bytes nbytes are initialized with the arguments of the cbzero instruction.

Figure 5:
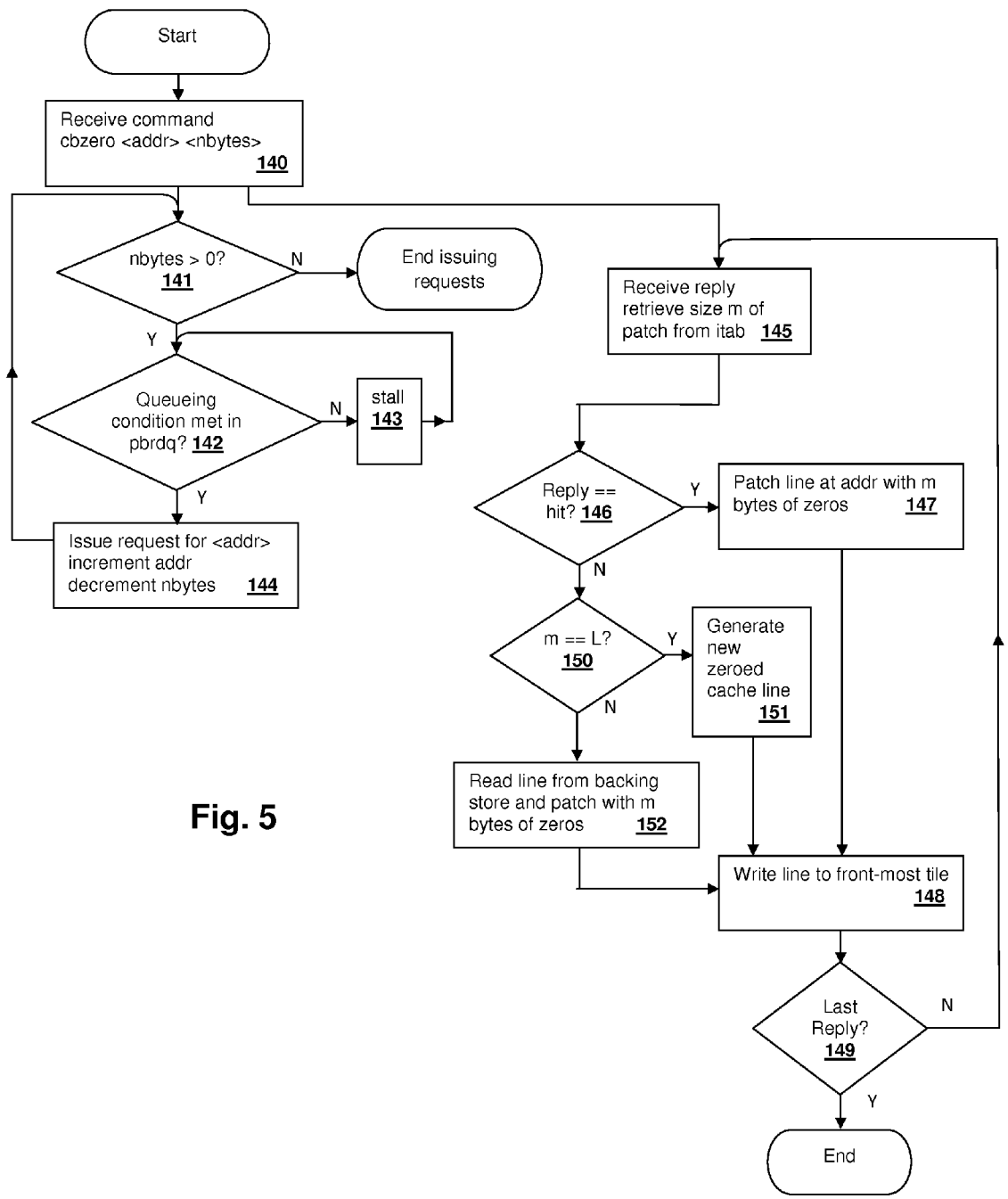
FIG. 5 is a flowchart illustrating a method of performing a zeroing operation in accordance with an embodiment of the present invention.

As long as the active bit in register 120 is set, memory interface 106 issues a request for address addr into the spiral cache. The issuing of a request is performed by inserting an entry into issue table itab and issuing the request into spiral cache 104, as described above for other requests. However, the issue table itab entry fields are used in the cbzero command operations as follows. The cbzero command is decoded and field addr is copied into the address location of the entry. The store-value field of the entry in issue table itab is used to store the number of bytes to be set to zero (the m output value of the control unit of FIG. 4). The operation performed in response to the cbzero command is illustrated in FIG. 5. A cbzero command of the form cbzero <addr><nbytes> is received (step 140). While the value of nbytes is non-zero (decision 141) and an entry is available in push-back read queue pbrdq (decision 142) then a request is issued for a cache line having an address addr (step 144). Address addr is also incremented (by a size m determined as illustrated in FIG. 4) and nbytes is also decremented by size m (step 144). If an entry is not yet available in push-back read queue pbrdq (decision 142) then the cbzero command is stalled (step 143) until an entry is available.

When spiral cache 104 responds to the request for the cache line, potentially after multiple retries, the outcome can be either a hit or a miss. The reply is received and the size of the patch m is retrieved from issue table itab. If the reply is a hit (decision 146), the line at address addr is patched with m bytes of zeros (step 147). Then, the cache line is written into front-most tile 0 of spiral cache 104 (step 148). In case of a miss (decision 146), the operation determines whether the size of the patch m is equal to a cache line size L (decision 150). If an entire cache line is to be patched, then a new zeroed cache line is generated (step 151) and the cache line is written to front-most tile 0 (step 148). If the cache line is only partially covered by the patch (decision 150), memory interface 106 submits a read request to backing store 112. Backing store 112 enqueues the cache line into backing store queue bsq and after memory interface 106 dequeues the reply, the cache line is patched with m bytes of zeros (step 152), before writing the patched cache line into front-most tile 0 (step 148). Until the last reply is received (decision 149), incoming replies are handled by steps 145-148. The order in which the cache lines of a larger address range are set to zero is immaterial. Therefore, the memory interface issues requests into the spiral cache whenever it can do so without violating the queueing conditions that prevent overflows. After issuing a request, register 120 of the cbzero control unit of FIG. 4 is updated. The update includes incrementing address addr by value m using adder 123 and decrementing the number of bytes nbytes by value m with subtractor 124. When number of bytes nbytes becomes zero, the active bit of register 120 is reset. While the active bit is set, memory interface 106 gives the cbzero instruction priority over dequeuing new memory operations from load-store queue ldstq. Once the active bit is reset, memory interface 106 returns to normal operation. Note that the ordering guarantees for memory operations implemented by memory interface 106 (via issue table itab) ensure that the cbzero instruction executes in order with unrelated memory operations that affect the same cache lines. No additional ordering constraints beyond those implemented for load-store operations within spiral cache 104 need to be imposed to ensure correct execution of the cbzero instruction with respect to the sequence of memory operations.

In order to ensure that the cbzero operation does not cause overflow of push-back read queue pbrdq, which will occur when the address range of the cbzero instruction covers a relatively large number of cache lines not present in the spiral cache, a flow control mechanism is used. As described above, for each line that is covered entirely by address range addr and is not present in the spiral cache, a zeroed cache line is written into front-most tile 0 of spiral cache 104. Each of the write operations generated by the cbzero operation may cause a conflicting line to be pushed out of front-most tile 0. In a worst-case scenario, each line pushed out of front-most tile 0 ripples through the spiral push-back network of spiral cache 104, and causes a cache line to be pushed out at the tail end of spiral cache 104 and to be enqueued in push-back read queue pbrdq. If the size of address range addr is much larger than spiral cache 104, the execution of the cbzero instruction assumes a steady state, where every move-to-front request for a cache line misses in the spiral cache. Each miss causes a zero line to be written into front-most tile 0, which in turn results in a cache line being pushed out the tail end into push-back read queue pbrdq. Due to the pipelining capability of spiral cache 104, the illustrated worst-case scenario produces one push-back per duty cycle. As a consequence, push-back read queue pbrdq, no matter how large, can overflow, since presumably slow backing store 112 dequeues entries at a much lower rate than spiral cache 104 enqueues push-back values. To prevent push-back read queue pbrdq from overflowing, a flow control mechanism specific to the cbzero instruction is employed. The flow control mechanism can be implemented as part of the cbzero control unit of FIG. 4, without further changes to memory interface 106. In the method illustrated in FIG. 5, decision 142 enforces a queueing condition that, after issuing $3\sqrt{N}$ requests into a 1-quadrant spiral cache with N tiles, stalls issuing for N duty cycles, which is the condition expressed by "queueing condition met." The stalling provides time for each group of $3\sqrt{N}$ newly inserted zeroed cache lines to cause push-outs to ripple through the N tiles of push back network 114 of spiral cache 104, and to enqueue push-outs from the tail end of spiral cache 104 in push-back read queue pbrdq. If the push-outs fill push-back read queue pbrdq further issue of move-to-front requests is stalled by the already existing queueing condition of decision 142, which requires that push-back read queue pbrdq must have at least $3\sqrt{N}$ free entries.

Cache Reconcile and Flush Operations The crecon and cflush operations listed above provide for cache consistency control. These two cache instructions are motivated by and can be used to implement various memory consistency models. In the context of multiprocessing, a computer system with multiple processors may be implemented, in which each processor has a private spiral cache, and in which backing store 112 is shared among all processors. The illustrative systems of FIG. 1 and FIG. 2 can be considered as illustrating one processor 100 and its associated private spiral cache in such a multiprocessor system. The following cache instructions can be used to direct the transfer of data between spiral cache 104 and backing store 112:

crecon (cache-reconcile)—if a copy of a line in spiral cache 104 is modified, as indicated by the dirty bit being set, the reconcile operation copies the dirty line into backing store 112, and marks the line in the cache as clean.

cflush (cache-reconcile-and-flush, referred to as "flush")—to reclaim space in the cache, the reconcile-and-flush operation removes a clean line from spiral cache 104 by copying the line into backing store 112 if the cache line is dirty, and marking the cache line as invalid.

Data movement in spiral cache 104 in response to the crecon and cflush commands is the same. Both the resulting reconcile and flush operations cause a dirty cache line to be written into backing store 112. The instructions differ in the manipulation of the state bits valid and dirty in the spiral cache tiles, e.g., in the individual directories of the tiles that maintain the status of the stored cache lines. Different variants of the crecon and cflush instructions may be provided. A traditional implementation provides such instructions that operate on a unit of a cache line. Another implementation requiring a more complex methodology and structure, provides a cache sweep that applies the reconcile and flush operations to the entire cache. A hardware-implemented cache sweep operation provides advantages, as the corresponding software solutions are clumsier and less efficient, requiring several instructions to inspect the dirty or valid bit of each cache line, then read the tag, assemble the write-back address, and evict the cache line if it is dirty. A hardware implementation provided by a global reconcile and flush operation in accordance with an embodiment of the present invention provides efficient operation by iterating only over the subset of dirty or valid lines in each tile rather than over all of cache lines. Further, at least a portion of the individual operations as applied to each tile is performed in parallel, improving efficiency. While in the illustrated embodiment cache lines are the unit of transfer between spiral cache 104 and backing store 112, the individual cache directories maintain for each cache line one dirty bit per byte (the smallest addressable unit in the illustrated system) to facilitate proper merging of partially modified cache lines into backing store 112. The write operation provided within backing store 112 uses the byte-wise dirty bits as a mask to write only the dirty bytes of a cache line to the internal storage of backing store 112.

In the following exemplary implementation of the reconcile and the flush operations, which differ considerably from the cbzero operation described above, the reconcile and the flush operations are similar in structure, as both operations reconcile all dirty lines in spiral cache 104. In general, the flush operation performs all of the actions performed by the reconcile operation. The following is a high-level psuedo-code description of the reconcile operation:

```
for all lines in spiral cache do
    if cache line is valid and dirty then
        assemble write-back address using tag
        write cache line into backing store
        clear dirty bits
    endif
end for
```

The following is a high-level psuedo-code description of the flush operation:

```
for all lines in spiral cache do
    if cache line is valid then
        if cache line is dirty then
            assemble write-back address using tag
            write cache line into backing store
        endif
        invalidate line
    endif
end for
```

As illustrated, the reconcile and flush operations are similar in that they write all valid dirty lines to the backing store. The difference between the reconcile and flush operations is that the flush operation invalidates all of the valid lines, whereas the reconcile operation "cleans" all of the dirty lines. In spiral cache 104, the sweep over the cache lines is performed using a priority encoder that detects and selects one of the dirty lines for reconciling or one of the valid lines for flushing, respectively. The sweep terminates when no dirty lines remain (for reconcile) or valid lines remain (for flush). In spiral cache 104, a priority encoder is included within each of tiles 0-63 and serves as a line detector. In spiral cache 104 in accordance with the illustrative embodiment, the actions of the reconcile and flush operations are coordinated across tiles 0-63, in order to avoid overflowing push-back read queue pbrdq. Otherwise, all of the sub-operations used to implement the reconcile and flush operation could be performed in parallel in response to a single command. Therefore, in implementations that can ensure that the interface to backing store 112 will not overflow, e.g., when backing store 112 can accept a push-back at each systolic duty cycle or in implementations having push-back handshaking, a reconcile or flush command can be issued to tiles 0-63 and the cache will be automatically reconciled or flushed by action of the tiles. However, in the illustrated embodiment, individual reconcile and flush commands that include a tile specifier are implemented, and memory interface 106 sends the individual commands to each tile, in turn, to prevent overflow of push-back read queue pbrdq.

Figure 6:
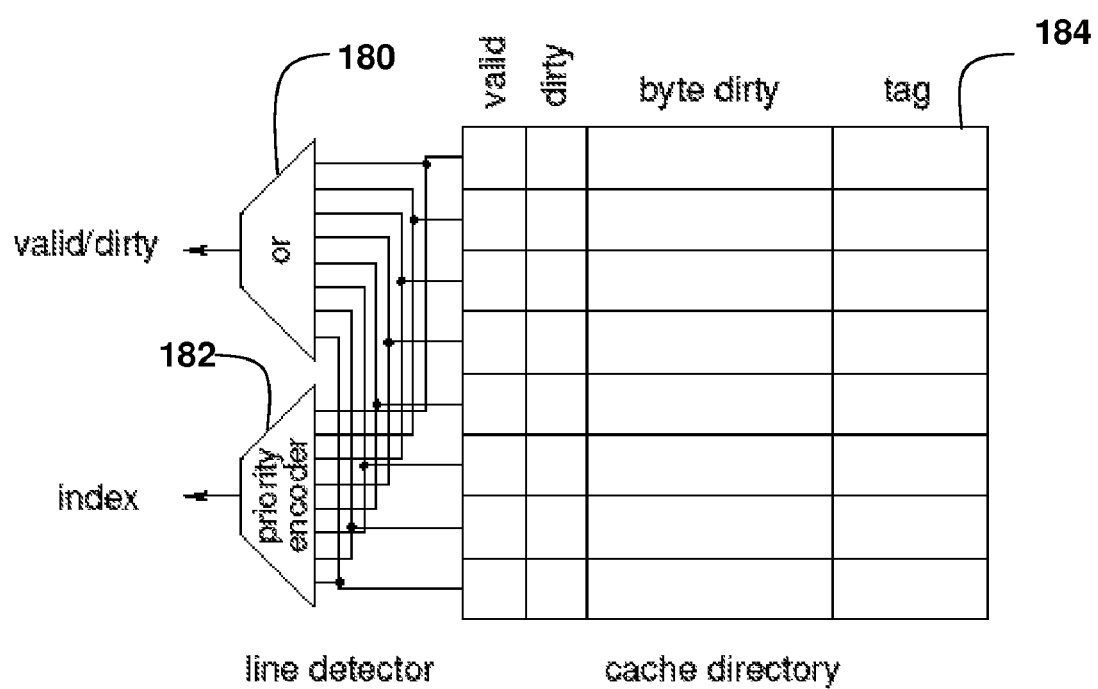
FIG. 6 is a block diagram of a line detector for performing a flush and reconcile operations in accordance with an embodiment of the present invention.

Referring now to FIG. 6, a line detector is shown to support the reconcile and flush operations described above, and that therefore is included in each of tiles 0-63 of spiral cache 104. Separate line detectors may be provided for the reconcile and flush operations or a single line detector may be used to support both operations. The line detector for the reconcile operations detects whether there exists at least one dirty line in the tile's cache, and provides the index (address within tile cache) of a dirty line by selecting one out of one or more dirty lines. The line detector for the flush operations detects whether there exists at least one valid line in the tile cache, and provides the index of a valid line by selecting one out of one or more valid lines. In the depicted line detector, an OR logic 180 determines whether the tile's cache contains at least one valid or dirty line, and a priority encoder 182 reports the index of one such valid or dirty line. For a reconcile operation, the inputs of both of OR logic 180 and priority encoder 182 are the dirty bits and for a flush operation, the inputs of both of OR logic 180 and priority encoder 182 are the valid bits. Therefore, it may be desirable to implement separate line detectors for the flush and valid operations. However, a selector can be provided for each entry in cache directory that selects between the valid and dirty bits in response to an operation type indication (reconcile or flush). Since the dirty and valid bits are generally stored in the directories of the caches within tiles 0-63, the line detector is also generally included in the directory. The directory generally contains one dirty bit per byte for each cache line. To obtain a dirty indication for the entire cache line as an input to OR logic 180 and priority encoder 182, the disjunction (logical or) of all of the per-byte dirty bits, is either stored in a separate bit, or computed with an or-gate having inputs connected to the per-byte dirty bits. A traditional priority encoder circuit provides a binary encoding of one asserted input out of n input bits. The priority selection is often based on the bit position of the asserted inputs. For the line detector of FIG. 6, the particular priority scheme is immaterial. The line detector need only identify a dirty or valid line if one exists. A fast priority encoder could be based on a parallel prefix circuit, which supplies the index as a one-hot encoding of n output bits. Such an implementation could save the address decoding effort when accessing the selected line.

As mentioned above, flow control is needed in the implementation of the flush and reconcile operations within spiral cache 104 to avoid overflow of push-back read queue pbrdq. Both the crecon and cflush commands eventually cause cache lines to be written to backing store 112. Since backing store 112 is presumably much slower than spiral cache 104, backing store 112 determines the rate of push-out of cache lines from spiral cache 104. To move the dirty lines out of spiral cache 104, there are two options. In the first option, M2F network 116 could be used to move the dirty lines to front-most tile 0 (without writing them into front-most tile 0), and read queue rdq can be re-purposed to enqueue the dirty lines as write requests to the backing store. In the second option, push-back network 114 can be used without modification. Both options require similar implementation complexity. The push-back option will be used in the illustrative embodiment since that option requires the least modification to the operation of spiral cache 104. The serialization of the data transfers of dirty lines from each of tiles 0-63 to backing store 112 also must be considered. In principle, there are two extreme options: each of tiles 0-63 may act independently, issuing its dirty lines as push-out signals into push-back network 114 whenever possible in a conflict-free fashion, e.g., during duty cycles when the tile does not receive a push-in signal, which also may generate a push-out signal. On the other hand, data transfers to backing store 112 may be controlled by imposing an order in which tiles 0-63 may reconcile their caches. Since, as already explained, the first operation provides the potential for overflowing push-back read queue pbrdq, because each push-out from a tile may cause a pipeline of swaps towards the tail end of spiral-cache 104 and a cache line to be pushed back into push-back read queue pbrdq. Therefore, in the illustrative embodiment, the rate at which cache lines are pushed out of the spiral cache into push-back read queue pbrdq is controlled, which is performed by coordinating the order in which tiles 0-63 may reconcile or flush their caches, to control the flow of data transfers out of each tile. Memory interface 106 controls the order in which the tiles reconcile their caches by sending individual commands directing individual ones of tiles 0-63 to reconcile or flush a single cache line from its internal cache. Also, a communications pathway is needed to communicate control information for implementing the reconcile and flush operations between memory interface 106 and individual tiles 0-63. A new, separate network could be provided, or M2F network 116, which is already used for requests, can be used. In the illustrative embodiment, the individual tile reconcile and flush commands are sent to tiles 0-63 via M2F network 116.

Figure 7:
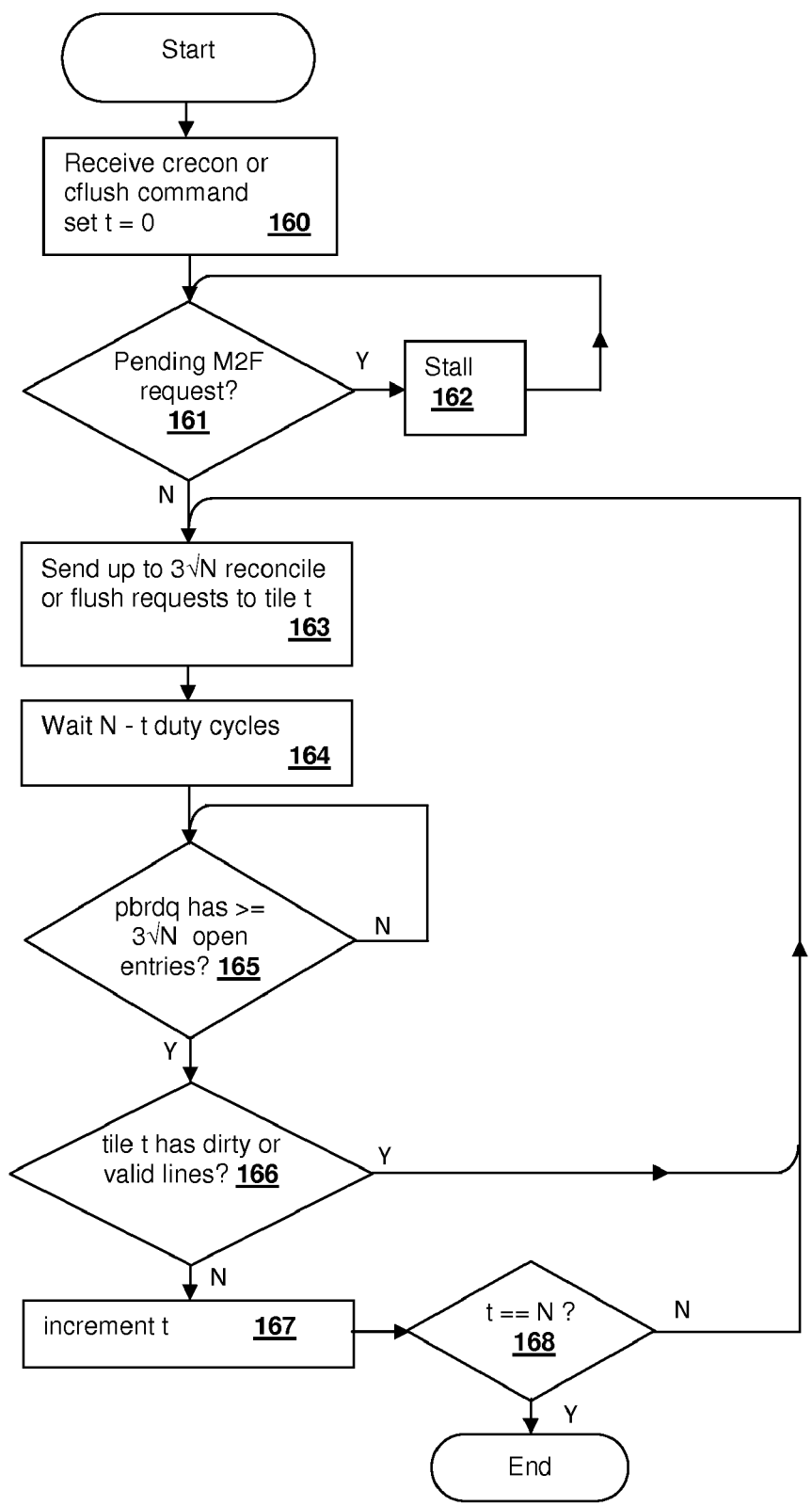
FIG. 7 is a flowchart illustrating a method of performing reconcile and flush operations in accordance with an embodiment of the present invention.

Front-to-tail operation While the individual tile operations directed by memory interface 106 could be performed in any order, two particular orders: tail-to-front and front-to-tail provide predictable delays in the push-out of values to backing store 112 on a per-tile basis, and therefore the tail-to-front and front-to-tail ordering of reconcile and flush commands will be considered below. Referring now to FIG. 7 an algorithm implementing a front-to-tail ordering is shown. A crecon or cflush command is received by memory interface 106 (step 160) and while pending move-to-front operations preceding the command are in progress (decision 161) as indicated by an entry in issue table itab, the command is stalled (step 162). Once all pending move-to-front requests are cleared (decision 161), then up to $3\sqrt{N}$ reconcile requests are sent by memory interface 106 to tile t (step 163), and a wait of N-t duty cycles is completed to ensure that any push-backs out of tail end tile 63 that are caused by the reconcile requests are enqueued in push-back read queue pbrdq (step 164). A check of open entries in push-back read queue pbrdq is performed to determine whether to continue to wait (decision 165), and once the number of open entries is greater than or equal to equal to the number of reconcile or flush requests sent (e.g., $3\sqrt{N}$), the t is checked to determine if there are any dirty lines (for reconcile operations) or valid lines (for flush operations) (decision 166). If dirty/valid lines remain in tile t (decision 166), steps 163-165 are repeated until all of the dirty lines are reconciled or valid lines are flushed from tile t. Tile t is set to the next tile (step 167) and until the last tile is reached (decision 168) steps 163-167 are repeated for the next tile, so that the entire cache is swept. The above algorithm is performed by a separate control unit in memory interface 106. As in the case of the cbzero command implementation described above, once a crecon or cflush instruction is in progress, its completion assumes priority over dequeuing new instructions from load-store queue ldstq. Unlike the cbzero instruction, all outstanding memory operations must be complete (decision 161) before performing the operations that implement a crecon or cflush instruction. Otherwise, memory operations already in progress may interfere with the cache reconciliation. For example, if processor 100 issues a reconcile operation after a store operation, if the store operation requires an access to backing store 112 due to a cache miss, and memory interface 106 starts performing the reconcile operation before the store operation is completed, the reconcile operation may have completed reconciling front-most tile 0 before backing store 112 returns the cache line associated with the store operation. When memory interface 106 patches the cache line with the store value and stores the dirty cache line in front-most tile 0, memory interface 106 completes the store operation out of order, that is, after the reconcile operation and not before, potentially causing incorrect program execution.

Individual tiles 0-63 of spiral cache 104, upon receiving a reconcile (or flush) command from memory interface 106, check the line detector to determine whether the tile's cache contains a dirty (or valid) line, and pushes out the dirty line (or valid) line at the address selected by the line detector. Tiles 0-63 ignore a reconcile or flush command if the tile has no dirty (or valid) lines. Communication between memory interface 106 and tiles 0-63 via M2F network 116 can be implemented as follows. M2F network 116 is used as a multicast network which communicates with a subset of the tiles depending on the selection of the retry bound. A reconcile or flush command is sent from memory interface 106 to one particular tile by broadcasting it via M2F network 116. In order to accomplish a broadcast, the implementation of M2F network 116 is extended to include a type field that distinguishes regular move-to-front requests from reconcile and flush commands. The broadcast includes a destination tile identifier t in what would ordinarily be the address field for M2F requests/responses, such that all tiles except for specified tile t will ignore the command. A reply from tile t to memory interface 106 can be piggybacked on the request, by populating the data field of the move-to-front signal with the dirty or valid information from the line detector before the move-to-front signal leaves specified tile t and returns to the front as a reply. Since tile t is the only tile to send the dirty or valid information (here an indication of whether there are remaining dirty or valid lines in tile t's cache), no conflicts will occur on M2F network 116. The memory interface uses the reply information to inform decision 166 of FIG. 7. The effect of a front-to-tail sweep on spiral cache 104 can be viewed as a sequence of shift operations if all cache lines of the spiral cache are valid and dirty. Under such conditions, reconciling front-most tile 0 has the effect of pushing all cache lines from tile 0 into tile 1. By virtue of the push-back operation, this causes all cache lines from tile 1 to be pushed back into tile 2, and so on, until tail tile N−1, which pushes all of its cache lines back into backing store 112. Thus, after reconciling front-most tile 0, all cache lines of front-most tile 0 are clean (or invalid for flushing operations). All other tiles t are storing the cache lines that were in tile t−1 before the reconciling front-most tile 0. Each iteration of the loop between steps 163 and 167 of FIG. 7 causes another shift of the tile contents towards the tail end of spiral cache 104, until all tiles are clean (or invalid). When only a subset of the cache lines are dirty or valid, the shift affects only the subset of lines.

The flow control implemented in steps 163-165 of FIG. 7 provides the same overflow prevention described above with respect to the cbzero instruction implementation. Memory interface 106 controls the number of cache lines that leave spiral cache 104 via push-back network 114 by throttling the issue of requests. When memory interface 106 detects at least $3\sqrt{N}$ free entries in push-back read queue pbrdq, it issues $3\sqrt{N}$ crecon or cflush requests to tile t. Before issuing the next batch of $3\sqrt{N}$ requests, memory interface 106 waits until the corresponding push-backs have been enqueued in push-back read queue pbrdq, and waits until the backing store has dequeued enough entries to free at least $3\sqrt{N}$ entries of the pbrdq queue. A particular implementation of the method depicted in FIG. 7 may be optimized in two respects: 1) The amount of communication between memory interface 106 and each of tiles 0-63 may be minimized. Rather than sending batches of $3\sqrt{N}$ requests, memory interface 106 may send only one reconcile or flush command per batch, and the specified tile may reply with dirty or valid information after reconciling up to $3\sqrt{N}$ cache lines; 2) The wait time of N-t duty cycles in step 164 of FIG. 7 may be reduced by subtracting the network delay of the reply signal from tile t to memory interface 106.

Figure 8:
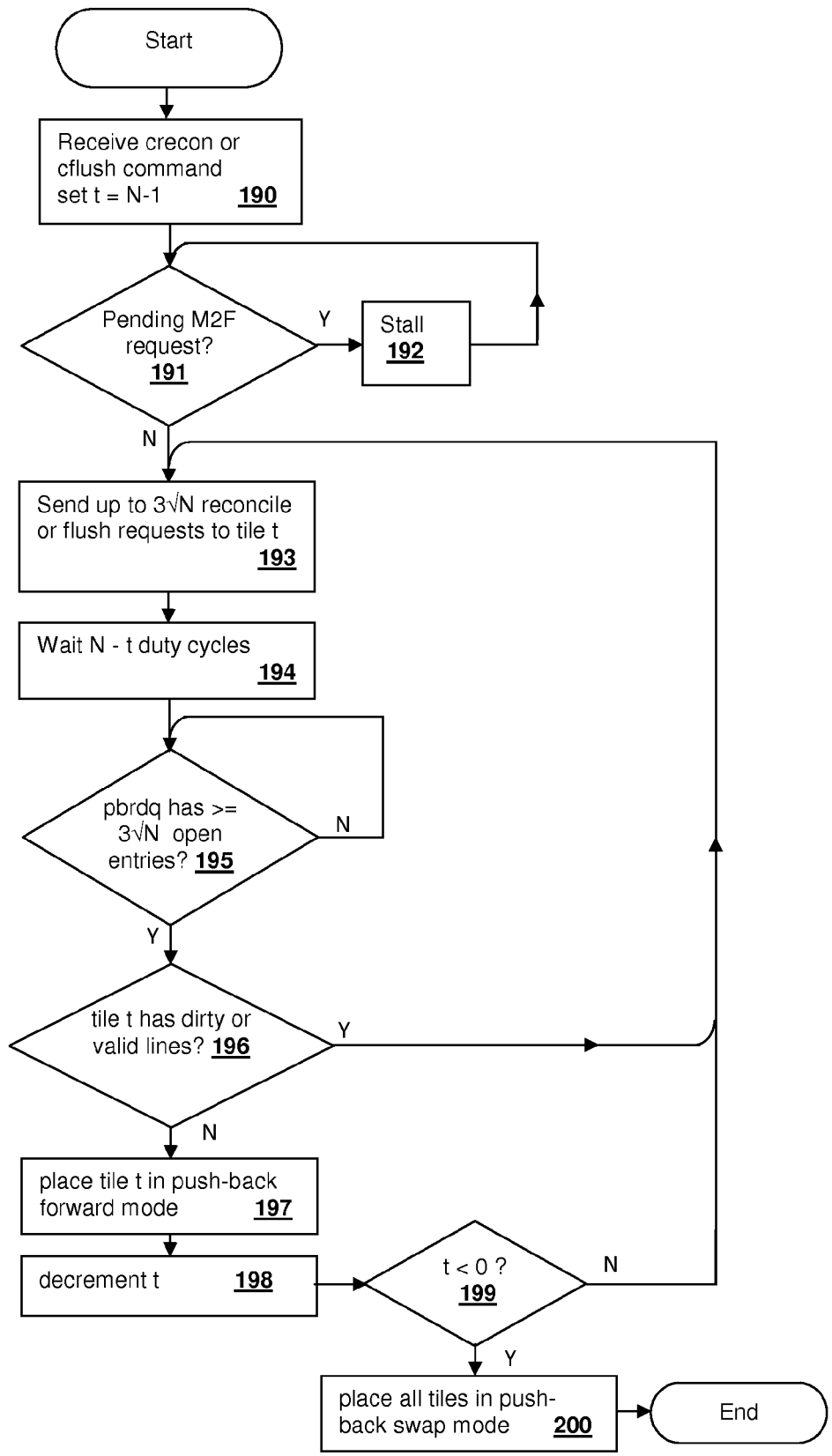
FIG. 8 is a flowchart illustrating a method of performing reconcile and flush operations in accordance with another embodiment of the present invention.

Tail-to-Front Implementation Referring now to FIG. 8 an algorithm implementing a tail-to-front ordering is shown. A crecon or cflush command is received by memory interface 106 (step 190) and while pending move-to-front operations preceding the command are in progress (decision 191) as indicated by an entry in issue table itab, the command is stalled (step 192). Once all pending move-to-front requests are cleared (decision 191), then up to $3\sqrt{N}$ reconcile requests are sent by memory interface 106 to tile t (step 193), and a wait of N-t duty cycles is completed to ensure that any push-backs out of tail-end tile 63 cause by the reconcile requests are enqueued in push-back read queue pbrdq (step 194). A check of open entries in push-back read queue pbrdq is performed to determine whether to continue to wait (decision 195), and once the number of open entries is greater than or equal to the number of reconcile or flush requests sent (e.g., $3\sqrt{N}$), tile t is checked to determine if there are any dirty lines (for reconcile operations) or valid lines (for flush operations) (decision 196). If dirty/valid lines remain in tile t (decision 196), steps 193-195 are repeated until all of the dirty lines are reconciled or valid lines are flushed from tile t. Once tile t's reconcile or flush operation is complete, tile t is placed in a push-back forward mode (step 197), in which values received at the push-in interface are forwarded to the next tile on the push-out interface, rather than swapped with values within the tile's cache. Next, tile t is set to the next tile (step 198) and until the last tile is reached (decision 199) steps 193-198 are repeated for the next tile, so that the entire cache is swept. Once the cache has been swept, all tiles are placed back into push-back swap mode (step 200). The primary difference between the tail-to-front and the front-to-tail strategy is the treatment of push-backs. The front-to-tail strategy, described above with reference to FIG. 7, reconciles the spiral cache in a fashion consistent with the normal push-back functionality of the spiral cache. Once a cache of a tile at the front is reconciled (or flushed), that tile will not receive any push-back signals until the tile sweep is complete. In contrast, the tail-to-front sweep illustrated in FIG. 8 reconciles the cache of the tail tile N−1 first. In the next iteration, when reconciling tile N−2, the regular push-back operation would store all lines of tile N−2 in tile N−1, without generating push-backs into the backing store. Therefore, if a tail-to-front sweep were performed without additional provisions, one tail-to-front sweep of a completely dirty spiral cache would implement a single shift by one tile toward the tail end of the spiral. After the sweep, front-most tile 0 would be clean, and tile t, 0<t<N, would contain the lines of tile t−1, which is not the correct functionality for reconcile or flush, which requires reconciling/flushing all dirty lines, not just those of tile N−1.

In order to obtain proper operation with a tail-to-front sweep, the push-back network of each tile is provided with the capability to forward incoming push-back signals and a state in which such forwarding is performed, rather than the ordinary swap operation of push-back network 114, as described above. The push-back forward operation does not access the tile cache. Instead, the tile pushes the incoming push-back signal out without further action. A mode bit is provided in each tile, to distinguish between regular push-back swap mode and push-back forward mode. As illustrated in FIG. 8, step 197, a tile is placed into the push-back forward mode after all dirty lines of the tile have been reconciled (or valid lines have been flushed). As the tile sweep loops towards the front of the spiral, all tail tiles beyond tile t forward the cache lines pushed back by tile t into push-back read queue pbrdq, and their tile caches remain in the desired reconciled or flushed state. Once the sweep is complete, all tiles are instructed to switch back into the regular push-back swap mode, in step 200 before the next memory operation can be issued. Commands can be provided for performing the mode switches, which can be sent to the tiles via M2F network 116. Although the tail-to-front algorithm requires additional logic to implement the push-back forward mode, the tail-to-front algorithm is more power-efficient than the front-to-tail algorithm. If the spiral cache with N tiles is completely dirty, the front-to-tail algorithm incurs $$\sum_{t=1}^{N-1} tC = \frac{1}{2} CN(N-1)$$

swap operations with C lines per tile cache that the tail-to-front algorithm does not perform.

Cache Interrupt Instructions The global cache operations initiated by special cache instructions cbzero, crecon, and cflush may take a long time to complete and can block the operation of processor 100 for unacceptable periods. In particular, problems may arise if processor 100 is interrupted by the system, for example to handle an I/O event. Therefore, processor 100 should be able to interrupt a long running cache instruction to service the interrupt, if the associated interrupt handler needs to access memory. Two additional global cache instructions are provided that may be used by interrupt handlers or other routines to gain access to the memory subsystem when one of the potentially long-running cache instructions is in progress:

cintr (cache interrupt)—interrupts a cache instruction, including cbzero, crecon, and cflush, ciret (cache interrupt return)—restarts a previously interrupted cache instruction.

Previously, there has been no need for cache interrupt instructions, because long running cache instructions like cbzero, crecon, and cflush have not been implemented. When processor 100 issues a cintr instruction, and memory interface 106 is in the process of executing a cbzero instruction, memory interface 106 resets the active bit in register 120 of FIG. 4 to stall further issuing of zeroing operations. When processor 100 issues a ciret instruction, the cbzero operation is restarted. If an interrupt handler interferes with the cbzero instructions by overwriting already zeroed cache lines, problems will occur. However, it is reasonable to delegate the responsibility to prevent such interference to the software, since the software is responsible for issuing the cbzero instruction as well as the cintr instruction. In contrast to the cbzero instruction, the crecon and cflush instructions are relatively easy to interrupt and restart. An interrupt aborts their execution completely, and a restart begins a new execution.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of performing a global cache operation in a storage device comprising a level of a memory hierarchy, wherein the storage device comprises a plurality of tiles connected by a network to propagate requests between neighboring ones of the plurality of tiles according to a systolic duty cycle, wherein the tiles have internal caches for storing cache lines, wherein the method comprises:
sending a command directing performance of the global cache operation to the plurality of tiles using the network to propagate the command, wherein the global cache operation potentially implicates multiple cache lines stored in the storage device across to the plurality of tiles; and
simultaneously performing at least a portion of the global cache operation in the plurality of tiles.

2. The method of claim 1, wherein the global cache operation is a flush or reconcile operation, wherein the tiles include dirty line detectors for selecting a dirty line from among one or more of the cache lines for sending to a backing store, and wherein in response to receiving the command at individual ones of the tiles, the tiles send the selected dirty line toward the backing store and the dirty line detectors select another dirty line.

3. The method of claim 2, wherein the sending sends the global cache operation to the individual tiles one at a time, whereby overflow of an input queue of the backing store is prevented.

4. The method of claim 3, wherein the sending sends multiple copies of the command to each individual tile in turn, and wherein the method further comprises waiting a predetermined delay time between sending the command to a next or same one of the individual tiles, wherein the predetermined delay time is predetermined such that a number of the multiple copies are guaranteed to enter the backing store before the next set of copies of the command are sent to the next or same tile.

5. The method of claim 1, and wherein the sending a command introduces the command into the network, and the command is propagated to the plurality of tiles via the network.

6. The method of claim 1, further comprising:
   sending an interrupt command to interrupt the global cache operation in the plurality of tiles; and
   responsive to receiving the interrupt command at the plurality of tiles, aborting the performing of the global cache operation in the plurality of tiles.

7. A method of performing an initializing operation in a storage device comprising a level of a memory hierarchy, wherein the storage device comprises a plurality of tiles, wherein the tiles have internal caches, wherein the method comprises:
   receiving an indication at a controller of the storage device to perform an initialization operation of an address range, wherein the address range includes at least one partial cache line, and wherein a full cache line corresponding to the partial cache line is stored within one of the plurality of tiles;
   retrieving the full cache line from the controller by issuing a request for the full cache line;
   responsive to receiving the full cache line, initializing a portion of the received full cache line corresponding to the at least one partial cache line with an initializing value to patch the cache line; and
   storing the patched cache line in the storage device.

8. The method of claim 7, wherein the plurality of tiles are connected via a move-to-front network, wherein the controller is a memory interface connecting a front-most one of the tiles to a processor or a lower-order member of a memory hierarchy including the storage device, and wherein the storing stores the patched cache line in the front-most tile.

9. The method of claim 7, wherein the address range includes multiple cache lines, and wherein the method further comprises:
   determining whether or not a next cache line of the address range is a full cache line;
   responsive to determining that the next cache line is a full cache line, repeating the retrieving and initializing for the next cache line;
   responsive to not receiving the full cache line from the storage device and determining that the next cache line is a full cache line, writing a new cache line into the storage device initialized with an initializing value; and
   responsive to not receiving the full cache line from the storage device and determining that the next cache line is not a full cache line, retrieving a cache line corresponding to the next cache line from a backing store and initializing a portion of the retrieved cache line corresponding to the next cache line cache line with the initializing value to patch the next cache line, and writing the patched next cache line to the storage device.

10. The method of claim 7, further comprising:
    receiving an interrupt command at the controller to interrupt the initialization operation in the storage device; and
    responsive to receiving the interrupt command at the controller, halting performing of the retrieving and initializing until a return-from-interrupt command is received by the controller.

* * * * *